UNITED STATES PATENT OFFICE.

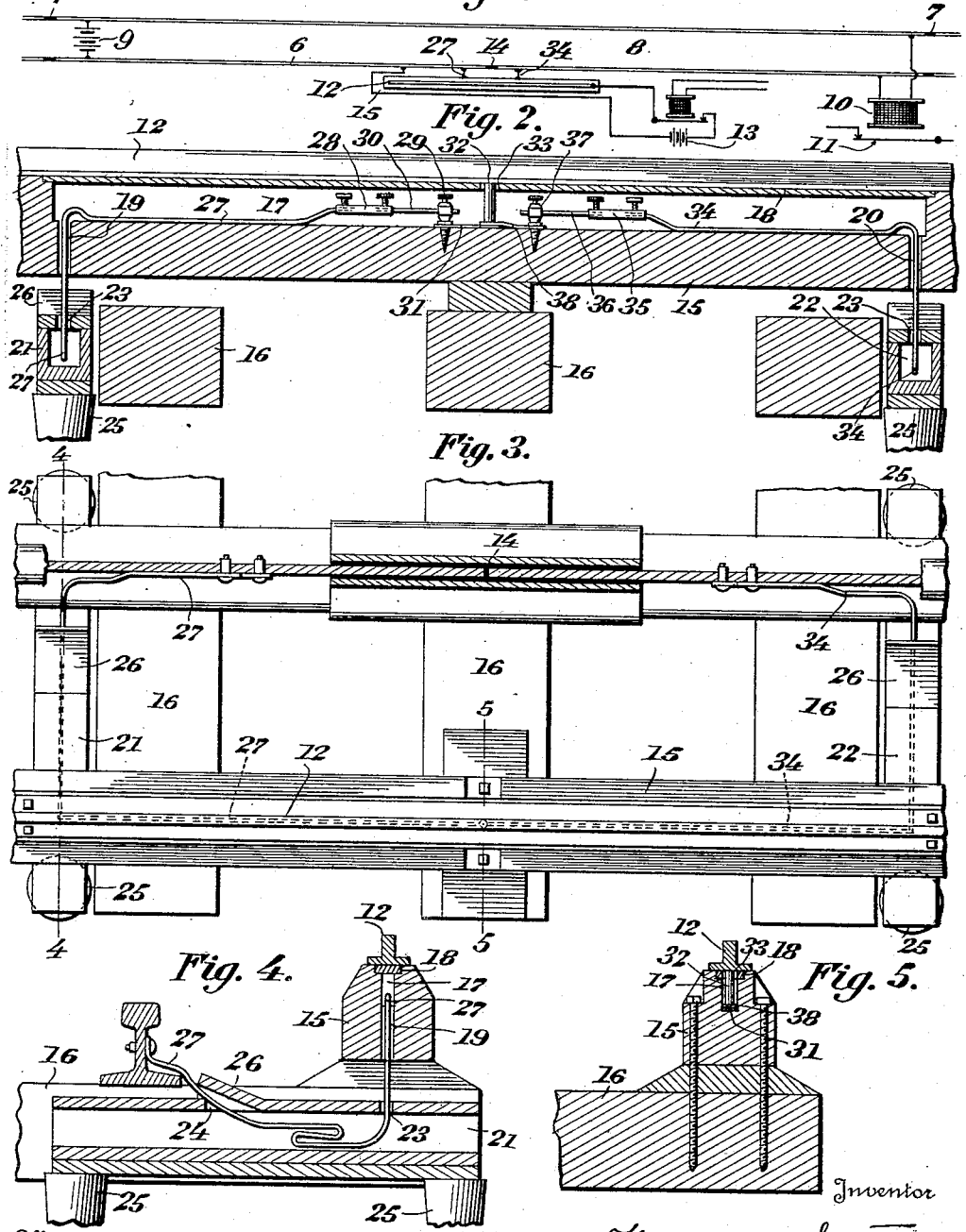

THOMAS W. SCOTT, OF BALTIMORE, MARYLAND.

RAMP-RAIL-CONTROLLED TRACK-CIRCUIT.

1,189,210.  Specification of Letters Patent.  Patented June 27, 1916.

Application filed August 5, 1914. Serial No. 855,148.

*To all whom it may concern:*

Be it known that I, THOMAS W. SCOTT, a citizen of the United States, residing at Baltimore, in the State of Maryland, have invented certain new and useful Improvements in Ramp-Rail-Controlled Track-Circuits, of which the following is a specification.

This invention relates to an improved ramp-rail controlled track circuit for safety train-control systems, and has particular reference to a train-control system substantially like that shown in U. S. Patent No. 1,010,372 granted November 28th, 1911, wherein the track rails are formed into insulated blocks or sections and at intervals short ramp rails are employed with which a contact shoe or shoes on the vehicle make contact to temporarily pick up a current, when safety conditions prevail and thereby substitute circuit through controlling devices on the vehicle in the place of a normal vehicle circuit which latter becomes interrupted when the shoe rides over a ramp rail.

The present invention has for its object to provide an improved arrangement of circuits whereby the removal of a ramp rail will cause an interruption in the circuits that will leave the latter in a condition to give a caution signal at a distance and which will effect an automatic stop of a vehicle approaching the section where such ramp rail has been removed. With these are other objects in view, the invention is illustrated in the accompanying drawing, wherein,—

Figure 1 shows in a diagrammatic way, a section of track rails and a ramp rail to which the invention is applied. Fig. 2 illustrates a vertical longitudinal section through a ramp rail support and a cross-section through the conduits for the wires that connect the track rails around the insulated joint. Fig. 3, shows a top plan view of the ramp rail, its support and the conduits and also shows the insulated joint in the track rails. Fig. 4, illustrates a cross-sectional detail on the line 4—4 of Fig. 3, and Fig. 5, shows a cross-sectional detail on the line 5—5 of Fig. 3.

In practice the track rails 6, are provided with insulations 7, at spaced apart intervals to form insulated sections 8, and each section is provided with a current supply such as a battery 9,—one side of the current supply being connected to one track rail and the other side of said current supply being connected to the other track rail. Preferably the connections of the current supply with the track rails are at one end of the section, while at the other end of said section the rails are connected to a relay 10, which controls an armature 11, which latter controls connections to ramp rails ahead and behind the insulated section.

A ramp rail 12, is located along the side of one of the track rails and as set forth in said patent, a current from a local battery 13, is picked up from the said ramp rail when the vehicle shoe passes over the same, provided the conditions ahead are such as to permit the vehicle to proceed. It is to be understood however, that the current picked up from a ramp rail is a separate and distinct current from that supplied to the track rails 6, by the battery 9.

In the system hereinbefore noted if a ramp rail is maliciously removed the vehicle would proceed without a stop, and to avoid this is one of the objects of this invention.

One of the track rails 6, is provided with an insulated joint 14, at a point between the current supply 9, and the relay 10, and I provide a connection around said insulated joint and utilize the ramp rail to maintain that connection, so that if the ramp rail is removed said connection around the insulated point will be interrupted.

In carrying out the inventive idea I provide a support 15, which is sustained above the ends of the cross ties 16, and which extends parallel with the track rails. On this support I secure the ramp rail 12, the particular shape of which latter is immaterial. The upper side of the support 15, is provided with a longitudinal recess 17, and a cover plate 18, is preferably provided for said recess. At the ends of the recess 17, there are provided vertical passages 19 and 20, respectively which extend down through the support and open at the bottom thereof. Beneath the support and extending laterally therefrom are conduits 21 and 22 respectively,—one being located beneath the passage 19 and the other beneath passage 20. These conduits extend from the ramp rail support laterally toward the track rail and are provided with openings 23, directly beneath the support and also have openings 24, adjacent to the track rail, as clearly shown in Fig. 4 of the drawing. Suitable stakes 25, are driven into the ground between the cross-ties and the conduits are sustained on these stakes. The openings 24, of the conduits are preferably provided with inclined baffles 26, to close them from the upper side.

To form a connection around the insulated track-rail joint 14, I connect a wire 27, to the rail at one side of the joint which wire extends down through the opening 24, into conduit 21 then along the conduit and up through the opening 23, to passage 19 in the ramp rail support and finally extends laterally into recess 17, at the upper side of the support where it is attached preferably to a connector 28. A binding post 29, is located in the recess to one side of the connector 28, and a wire or other connection that is readily ruptured, such as a fuse wire 30, connects the connector 28 and binding post 29. A contact plate 31, extends from the binding post 29, and has position under a vertically-extending pin 32, whose upper end projects through a perforation 33, in the cover plate. The upper end of this pin is in contact with the bottom side of the ramp rail 12, and said pin is held down by means of said rail. A wire 34, is connected to the track rail at the other side of the insulated joint 14, and extends down into the conduit 22, then up through openings 23, and 20, into recess 17 of the ramp rail support. This wire 34, is attached to a connector 35, in the recess 17, and a readily breakable wire or other connection 36, extends from the connector to a post 37. A spring contact plate 38, extends from the binding post 37 and has a lap contact with the plate 31. This plate 38, also has position beneath the pin 32, so that said pin may press the two plates 31 and 38 together so as to form a circuit closer and hold them in contact as long as the ramp rail 12, is in place to hold the pin down. It will thus be understood that from the track rail at one side of the joint 14, there is a wire 27, that leads to the recess 17, beneath the ramp rail, while another wire 34, from the rail at the other side of the joint also enters the recess 17, and that connection between these two wires is maintained by the pressure of the ramp rail 12,—the means employed in the present instance being the pin 32, which acts as a circuit closer and the contact plates 31 and 38. It is to be understood however that neither plate 31 nor 38, has any contact whatever with ramp rail 12, because pin 32, is formed of insulating material and that the ramp rail is simply utilized to maintain the connection around the insulated joint in the track rails without having any electrical connection with the track rails. If the ramp rail is removed, either accidentally or maliciously, the plates 31 and 38, will separate and the circuit from track rail battery 9, through relay 10, will be interrupted so that armature 11, will drop and interrupt circuits to other ramp rails,—for example as disclosed in pending application Serial Number 838,212 filed May 13th, 1914.

Having thus described my invention what I claim is,—

1. The combination with the track rails formed into insulated sections, of a relay connected with the track rails of a section; a current supply for the section; a circuit including the current supply, the track rails and the said relay; a ramp rail normally electrically disconnected with respect to the track rails and means actuated by the ramp rail to maintain the circuit between the current supply and the relay.

2. The combination with the track rails formed into insulated sections, of a relay connected with the track rails of a section; a current supply; a circuit including the current supply, the track rails and the relay; a ramp rail; an insulated joint in one of the track rails between the current supply and relay of a section and means controlled by the ramp rail and extending from the track rail at one side of the insulated joint to the track rail on the other side of said joint to maintain said circuit around said joint.

3. The combination with the track rails formed into insulated sections, of an insulated joint in at least one of the two track rails between the two ends of a section; a relay connected with the two track rails at a point beyond the said insulated joint; connections leading from the track rail at one side of the insulated joint to the track rail at the other side of the said joint said connections including a circuit closer, a current supply; a circuit including the current supply, track rails, relay and the said connections and circuit closer; and a ramp rail normally electrically disconnected with respect to the track rails and the connections around the joint of the latter said ramp rail holding the circuit closer in a closed connection.

4. The combination with the track rails formed into insulated sections, of a relay connected with the track rails; a current supply for the section; a ramp rail support having a recess therein; a circuit closer in said recess; a circuit including the said current supply, track rails, circuit closer and relay and a ramp rail on the support said ramp rail holding the circuit closer closed to maintain the said circuit.

5. The combination with track rails formed into insulated sections, of a relay connected with the track rails; a current supply for the section; a circuit closer; a circuit including the said current supply, track rail, circuit closer and relay; a ramp rail normally electrically disconnected from the track rail, and mechanical means actuated by the ramp rail to hold the circuit closer in condition to maintain said track rail circuit.

In testimony whereof I affix my signature in presence of two witnesses.

THOMAS W. SCOTT.

Witnesses:
 LOUIS C. KLERLEIN,
 CHARLES B. MANN, Jr.

Copies of this patent may be obtained for five cents each, by addressing the "Commissioner of Patents, Washington, D. C."